United States Patent
Andersson et al.

(10) Patent No.: US 9,276,279 B2
(45) Date of Patent: Mar. 1, 2016

(54) AUXILIARY POWER UNIT

(75) Inventors: Lennart Andersson, Varberg (SE); Peter Jozsa, Göteborg (SE)

(73) Assignee: Volvo Lastvagnar AB, Göteborg (SE)

( * ) Notice: Subject to any disclaimer, the term of this patent is extended or adjusted under 35 U.S.C. 154(b) by 805 days.

(21) Appl. No.: 12/739,736

(22) PCT Filed: Oct. 24, 2007

(86) PCT No.: PCT/SE2007/000935
§ 371 (c)(1),
(2), (4) Date: May 5, 2010

(87) PCT Pub. No.: WO2009/054755
PCT Pub. Date: Apr. 30, 2009

(65) Prior Publication Data
US 2010/0216042 A1    Aug. 26, 2010

(51) Int. Cl.
*H01M 8/06* (2006.01)
*B60L 11/18* (2006.01)
*B60R 16/033* (2006.01)
*H01M 8/04* (2006.01)

(52) U.S. Cl.
CPC ......... *H01M 8/0618* (2013.01); *B60L 11/1881* (2013.01); *B60L 11/1892* (2013.01); *B60L 11/1894* (2013.01); *B60R 16/033* (2013.01); *H01M 8/04029* (2013.01); *H01M 8/04164* (2013.01); *H01M 8/0662* (2013.01); *H01M 8/0668* (2013.01); *H01M 2250/20* (2013.01); *Y02E 60/50* (2013.01); *Y02T 90/32* (2013.01); *Y02T 90/34* (2013.01)

(58) Field of Classification Search
USPC .................................................. 429/410, 423
See application file for complete search history.

(56) References Cited

U.S. PATENT DOCUMENTS

| 6,358,638 | B1 * | 3/2002 | Rock et al. ................... 429/429 |
| 6,361,757 | B1 * | 3/2002 | Shikada et al. .............. 423/651 |
| 6,571,897 | B2 * | 6/2003 | Baumert et al. ............. 180/65.1 |
| 6,759,154 | B2 | 7/2004 | O'Brien et al. |
| 7,036,466 | B2 | 5/2006 | Goebel et al. |
| 2001/0016274 | A1 * | 8/2001 | Kawasumi et al. ............ 429/20 |

(Continued)

FOREIGN PATENT DOCUMENTS

| DE | 10337607 A1 | 3/2005 |
| EP | 1557896 A1 | 7/2006 |
| WO | 9944253 A1 | 9/1999 |

OTHER PUBLICATIONS

Nilsson et al., "Hydrogen Generation from Dimethyl Ether for Fuel Cell Auxiliary Power Units", Energy & Fuels 2006, vol. 20, p. 2164-2169.*

(Continued)

*Primary Examiner* — Ula C Ruddock
*Assistant Examiner* — Osei Amponsah
(74) *Attorney, Agent, or Firm* — WRB-IP LLP

(57) ABSTRACT

An auxiliary power unit (APU), a method of operating an APU and a vehicle comprising the APU are provided. The APU includes a fuel processor and a fuel cell, the fuel processor being provided with steam, air and dimethyl ether (DME). In order to avoid decreased functionality of the fuel cell caused by lubricants in the DME, a heat exchanger is provided for separating lubricant from the DME.

6 Claims, 2 Drawing Sheets

(56) References Cited

U.S. PATENT DOCUMENTS

2002/0114747 A1* 8/2002 Marchand et al. ............ 422/198
2006/0083964 A1* 4/2006 Edlinger et al. ................ 429/17

OTHER PUBLICATIONS

"Lubrication and wear in diesel engine injection equipment fuelled by dimethyl ether (DME)", 2003, Sivebaek et al.*
International Search Report for corresponding International Application PCT/SE2007/000935.
International Preliminary Report on Patentability for corresponding International Application PCT/SE2007/000935.
Nilsson, Marita et al, "Hydrogen Generation from Dimethyl Ether for Fuel Cell Auxiliary Power Units", Energy & Fuels 2006, vol. 20, p. 2164-2169.
Dams, Robert A.J. et al, "The Processing of Alcohols, Hydrocarbons and Ethers to Produce Hydrogen for a PEMFC for Transportation Applications", Energy Conversion Engineering Conference! 1997. IECEC-97., Proceedings of the 32nd Intersociety, Publication Date: Jul. 27, 1997-Aug. 1, 1997, vol. 2) p. 837-842, ISBN: 0-7803-4515-0.

* cited by examiner

AUXILIARY POWER UNIT

BACKGROUND AND SUMMARY

The present invention relates to an auxiliary power unit (APU), methods of operating an APU and a vehicle comprising said APU and/or said method.

One way to provide electric power and heat to the truck driver's welfare when not driving the truck is to use the engine as a power source. This is often an inefficient way to produce electricity and heat both from fuel consumption and emission aspects, and will also be subject to legal restrictions in the near future. Typical engine effiencieny at idle is around 5-10%. One way which this is solved is with an auxiliary power unit (APU) consisting of a fuel processor for converting diesel to hydrogen and a fuel cell for converting hydrogen to water and electric power.

To lower the demand for oil, there are ongoing work for alternative fuels. One alternative fuel is dimethyl ether (DME). For these vehicles there will also be a need for an APU. A fuel processor for DME may be simpler in construction than a diesel fuel processor with lower working temperature and fewer gas cleaning steps. In EP01060535B1 a fuel cell able to be used with DME as feed is described. With this fuel cell the APU can be simplified to just a fuel cell, water recovery, cooling and fuel and air pumping to the fuel cell.

However, a problem with DME is its very low lubricating properties. Therefore there is a need to mix DME with a small amount of lubricant before sold as fuel. This lubricant may have very different properties for fuel processing and may eventually cause the DME fuel processor to make gases not suited for a fuel cell. Another problem with APU's is the need of water to the fuel processor and the fuel cell, this is solved by condensing water from the fuel cells off-gases see e.g., U.S. Pat. No. 7,036,466B2. The cooling for the water condensing could be arranged by blowing ambient air by a fan. However this cost energy for the fan and can also be inefficient and even impossible in some climate due to the low condensing temperature needed. Some solutions of the latter is described in U.S. Pat. No. 6,759,154 and DE10337607.

As explained above, there is a problem associated with DME mixed with lubricant for the functionality and/or properties for the fuel cell in an APU.

It is desirable to provide an APU in which the above mentioned problem with DME mixed with lubricants is at least reduced or eliminated.

In a first example embodiment an auxiliary power unit (APU) comprising a fuel processor and a fuel cell, said fuel processor is provided with steam, air and DME. Said APU further comprising an afterburner for combusting rest fuel from the fuel cell, wherein exhaust gases from said afterburner is used for heating a first heat exchanger. Said fuel processor is preparing the vehicle fuel to a fuel suitable for the fuel cell and said fuel processor is provided between said fuel reservoir and said fuel cell. The interpretation of preparing is meant to include for instance one or more of the following: transformations, distillations, any form of reactions, adsorptions, absorptions, change of state of aggregation, mixtures, solutions, etc.

In another example embodiment said first heat exchanger has at least one inlet and at least one outlet, said at least one inlet is provided with DME comprising a lubricant from a fuel tank. Said at least one outlet from said first heat exchanger is providing clean DME, and said lubricant is trapped in said first heat exchanger.

In still another example embodiment the APU further comprising a second heat exchanger, said second heat exchanger is connected to the exhaust gases from said after burner, said second heat exchanger further comprising at least one inlet and at least one outlet, said at least one inlet is connected to a condenser with condensed water from the fuel cell, said outlet is connected to said fuel processor for providing steam to said fuel processor.

In still another example embodiment said first heat exchanger and said second heat exchanger is the same unit.

In still another example embodiment said first heat exchanger is heated by gases from a water condenser.

In still another example embodiment said first heat exchanger has a DME fuel inlet and DME gas outlet and a lubricant outlet.

In still another example embodiment said first heat exchanger has a gas inlet and gas outlet and an outlet for condensed water.

In still another example embodiment said first heat exchanger is heated by cooling water from the fuel cell.

In still another example embodiment said first heat exchanger has a DME fuel inlet and DME gas outlet and a lubricant outlet.

In still another example embodiment said first heat exchanger has a cooling water inlet and cooling water outlet.

It is desirable to provide an auxiliary power unit process in which the above mentioned problem with DME mixed with lubricant is at least reduced or eliminated.

In a first example embodiment an auxiliary power unit process comprising the actions of providing air, steam and DME fuel to fuel processor unit, extracting at least hydrogen from said fuel processor unit, providing said hydrogen and air to a fuel cell, condensing water extracted from said fuel cell in a condenser, combusting rest fuel from the fuel cell in an after burner, separating a lubricant from a DME fuel before providing said DME fuel to the fuel processor unit.

In another example embodiment of the auxiliary power unit process, said separating of DME and lubricant is performed by using exhaust gases from said after burner in a first heat exchanger.

In still another example embodiment said first heat exchanger is heated by gases from a water condenser.

In still another example embodiment said first heat exchanger has a DME fuel inlet and DME gas outlet and a lubricant outlet.

In still another example embodiment said first heat exchanger has a gas inlet and gas outlet and an outlet for condensed water.

In still another example embodiment said first heat exchanger is heated by cooling water from the fuel cell.

In still another example embodiment said first heat exchanger has a DME fuel inlet and DME gas outlet and a lubricant outlet.

In still another example embodiment said first heat exchanger has a cooling water inlet and cooling water outlet.

In yet another example embodiment the auxiliary power unit process further comprising the action of providing steam to said fuel processor by heating said water from said condenser in a second heat exchanger heated by said exhaust gases from said after burner.

In still another example embodiment of the auxiliary power unit process said first heat exchanger for providing steam is the same heat exchanger as the second heat exchanger for separating the lubricant from the DME fuel.

The present invention also relates to a vehicle provided with an engine for traction power, an auxiliary power unit (APU) and a reservoir of fuel. Said fuel is used for running said engine and said APU. Said APU comprising a fuel processor and a fuel cell, wherein said fuel processor is provided between said fuel reservoir and said fuel cell. Said fuel is dimethyl ether (DME), wherein means is provided for separating said DME fuel from at least one lubricant included in said DME.

BRIEF DESCRIPTION OF THE DRAWINGS

With reference to the appended drawings below follows a more detailed description of embodiments of the invention cited as examples.

In the drawings.

DETAILED DESCRIPTION

Figure 1A:
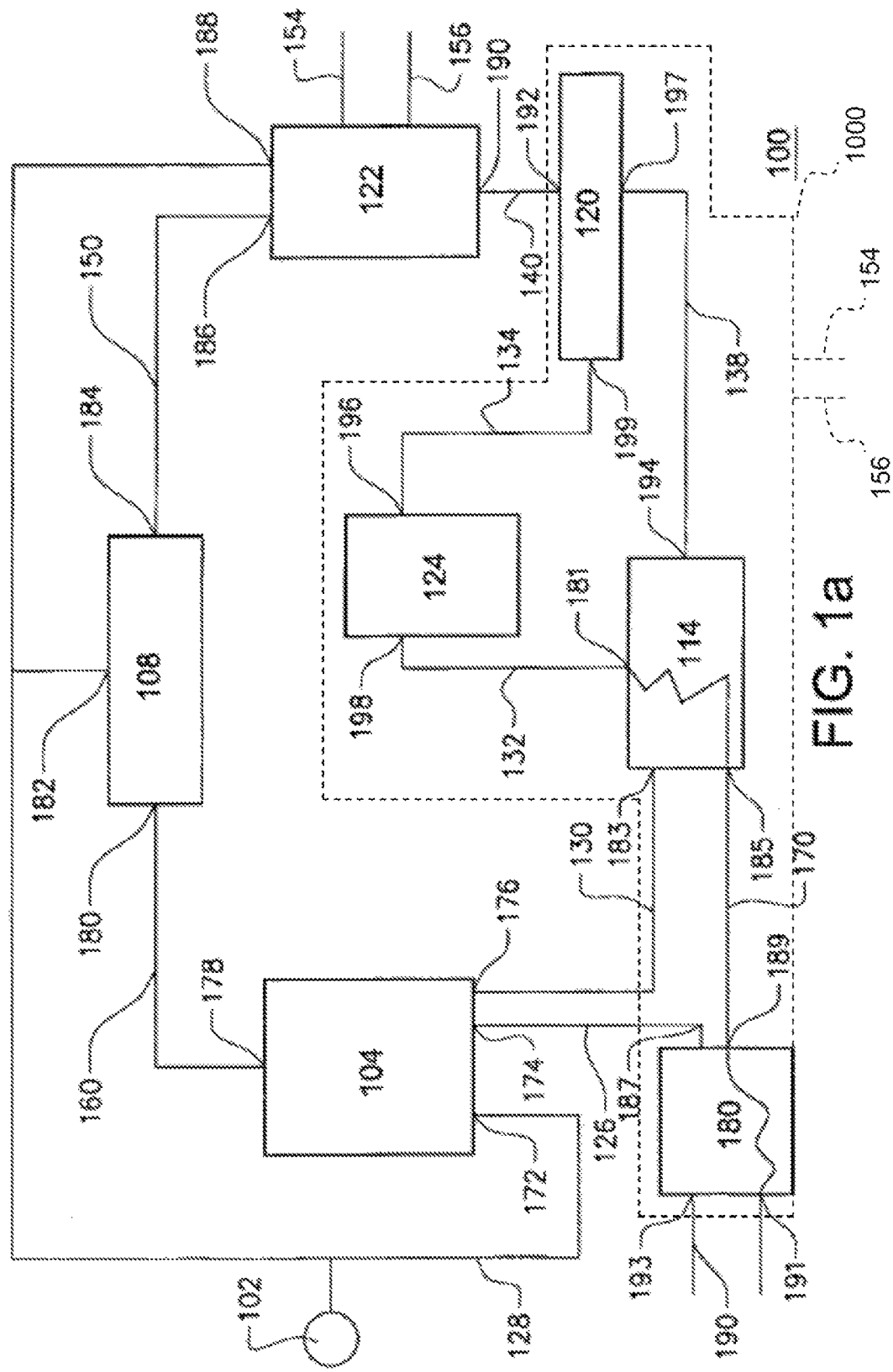
FIG. 1a shows a schematic view illustrating a first example embodiment of an APU according to the invention.

In FIG. 1a an APU 100 according to an example embodiment of the invention is schematically illustrated. The APU 100 comprises an optional air compressor 102, a reformer 104, a CO clean-up 108, a fuel cell 122, an afterburner 124, a condenser 120, a first heat exchanger 114 and a second heat exchanger 180.

The first heat exchanger 114 may be used interchangeably with the second heat exchanger 180 in the following text and claims, i.e., they may be the same unit or may change position with each other in the embodiments as illustrated in the figures and the following text.

The reformer 104 may have different designs and properties. In a first embodiment said reformer 104 comprises a mix zone and a catalytic converter. The mix zone is arranged at an inlet side of said reformer and the catalytic converter is arranges at an outlet side of the catalytic converter, i.e., said mix zone is arranged prior to said catalytic converter in a direction of flow of gases introduced into the reformer 104. Said first embodiment of the reformer 104 may be used when the gases to be reformed are not mixed before entering said reformer 104. In a second embodiment said reformer. 104 is a catalytic converter without a mix zone. The second embodiment of the reformer 104 may be useful when the gases to be reformed are premixed before entering said reformer 104. The catalytic converter in said reformer 104 may be made of ceramic or metal in the form of a monolithic structure. A catalytic material is attached onto said monolithic structure. Said catalytic material may for instance comprise different palladium-zinc alloy on Al2O3. Said catalytic converter may also be divided into different zones with different properties, i.e., different catalytic materials in different zones and/or different mixtures of two or more catalytic materials in different zones. A catalytic converter divided into zone as just described may be used to favour at least one reaction in a beginning or an end of the catalytic converter and/or to suppress at least a second reaction at the beginning or the end of the catalytic converter. Instead of using a monolithic structure as the bearer of the catalytic material pellets covered at least partially with catalytic material may be used. Said pellets may be in the form of solid bodies in any form for instance spherical or irregular. Said pellets may be made of ceramic material or a metal. Instead of using in the form of solid bodies, porous bodies may be used. Instead of covering the pellets made of non catalytic material at least partly with a catalytic material, said pellets may be made of a catalytic material.

Enclosing said pellets or monolithic structure and if present the mixing zone is a body made for instance of steel. Said body may be isolated. The reformer 104 may also be built as a heat exchanger. The temperature inside the reformer 104 may be between 250 C-700 C.

The reformer 104 has at least one inlet and at least one outlet. If present, the mixing zone is closest to said inlet and the catalytic converter is closes to the outlet. The reformer 104 is provided with different gases. The reformer 104 is a part of a process of reforming at least one gas into a suitable fuel for the fuel cell. According to an example embodiment of the present invention air, DME and steam are used as input gases into the reformer. In the example embodiment illustrated in FIG. 1a, air is provided air a first inlet 172, DME is provided at a second inlet 174, and steam is provided at a third inlet 176 of said reformer 104. In said reformer many different reactions are taking place. Some of the more important reactions are as follows:

DME+air: $CH_3OCH_3 + 3/2\ O_2 => 2CO_2 + 3H_2$     1)

DME+steam: $CH_3OCH_3 + 3H_2O \rightarrow 2CO_2 + 6H_2$     2)

DME+air: $CH_3OCH_3 + 1/2O_2 => 2CO + 3H_2$     3)

CO+steam: $CO + H_2O <=> CO_2 + H_2$     4)

DME+steam: $CH_3OCH_3\ H_2O =>> 2CH_3OH$     5)

Methanol+air: $CH_3OH + V_2\ O_2 => CO_2 + 2H_2$     6)

Methanol+steam: $CH_3OH + H_2O => CO_2 + 3H_2$     7)

Methanol+air: $CH_3OH + O_2 \rightarrow CO + 2H_2O$     8)

From the list of reactions above, desired reactions are reaction 1 and 2. The other equations (3-8)+the equations not mentioned are so called secondary reactions which may be suppressed as much as possible. Reaction number 4 is a balance equation which is moved to the right at higher temperatures.

From the outlet 178 of the reformer 104 comes inter alia N2, CO, H2, H20 CH4 and traces of other material and/or contaminations from inter alia the air provided at the input of the reformer 104.

In the illustrated embodiment in FIG. 1a, air is provided to the first inlet 172 of the reformer via a first pipe 128, DME is provided to the second inlet 174 of the reformer via a second pipe 126, and steam is provided to the third inlet 176 of the reformer via a third pipe 130. Air may be provided into the reformer with an overpressure created by an optional air compressor 102. In an alternative embodiment said reformer 104 only comprises one inlet for providing the different gases, which may be blended or not depending on the design of the reformer 104. If the gases are not blended, the above mentioned mixing chamber is in the reformer 104.

The outlet 178 of the reformer 104 is coupled to a first inlet 180 of the CO clean-up device 108 via a fourth pipe 160. In said fourth pipe 160, N2, CO, H2, H20 and CH4 from the reformer 104 are transferred to the CO clean-up device 108. Also provided to the CO clean-up device 108 is air to a second inlet 182 of said CO clean up 108 via pipe 128, which may or may not be provided with overpressure depending on the presence of the compressor 102. The CO clean-up device 108 may be built similarly as the reformer 104 with a slight difference in the material chosen for the catalytic converter. In the CO clean-up device 108 said catalytic converter material may be platinum-based. The temperature in the CO clean-up device is between 150C-180C. In one embodiment said CO clean-up device is built as a heat exchanger. Between the reformer 104 and the CO clean-up device 108 a heat exchanger may be provided.

A desired reaction taking place in the CO clean-up device 108 is:

$$CO + 1/2 O_2 \Rightarrow CO_2 \quad\quad\quad 9)$$

An optional reaction can be $H_2 + 1/2 O_2 \Rightarrow H_2O$ which will consume the hydrogen and is undesired and will lower the total efficiency for the system As the name of the device may suggest said CO clean-up device is used for transforming harmful CO which is present in the gases coming from the reformer 104 into less harmful CO2.

An output 184 of the CO clean-up device 108 is connected to a first inlet 186 of the fuel cell 122 via a fifth pipe 150. Air is also provided to a second inlet 188 of the fuel cell 122 via the first pipe 128. Depending on the presence of the air compressor 102 said air is provided to the fuel cell 122 with overpressure or not. Gases provided to the fuel cell 122 is air and the gases produced in the reformer 1.04 minus all or part of the CO content which is transformed into CO2 in the CO clean-up device 108. The reaction taking place in the fuel cell 122 is:

$$H_2 + 1/2 O_2 \rightarrow H_2O. \quad\quad\quad 10)$$

Said reaction is taking place on electrodes, where electrons are moving in wires and hydrogen ions are moving through an electrolyte membrane which separates the hydrogen gas from the air.

The fuel cell 122 has a first cooling pipe 154 and a second cooling pipe 156. In one of said first of second cooling pipes 154, 156 a coolant is provided to the fuel cell. In the other cooling pipe 156, 154 said coolant is transferred from the fuel cell. Said first and second cooling pipes 154, 156 may be coupled to a radiator not illustrated in FIG. 1a. The coolant may be air, water, AC coolant such as R-134A, or any other suitable coolant. Said coolant may be used in a heat exchanger arrangement 1000 as shown in phantom in FIG. 1a for separating the lubricant from the DME fluid. Another useful application of the coolant is to use its heat for heating the driver compartment. Another useful application of the heat is to transfer it to and through the engine and/or a cooling system for the engine in order to keep said engine warm while not running the engine.

An output 190 of the fuel cell 122 is connected to an inlet 192 of the condenser 120 via pipe 140. In said condenser 120, water is condensed to the bottom of said condenser 120 and separated from the rest of the gases coming from the fuel cell 122. Not all of the hydrogen provided to the fuel cell 122 via the fifth pipe 150 is consumed and transformed into water and energy in the fuel cell 122. The hydrogen which is not consumed in the fuel cell 122 (together with other gases not fully consumed in the fuel cell 122, inter alia methane), so called rest fuel, are transferred to an inlet 196 of the after burner 124 via pipe 134.

The after burner or combustor 124 may be constructed in similarity to the CO clean up device 108. The material in the catalytic converter may be a catalyst of Noble metal and/or base metals supported on a monolith.

The heat produced by the after burner 124 when combusting the rest fuel from the fuel cell 122 is used to make steam of the water coming from the condenser 120. From an outlet 198 of the combustor 124 is combusted gas transferred to a first inlet 181 of the heat exchanger 114 via pipe 132. Water from the condenser 120 is transferred from a first outlet 197 of the condenser 120 to a second inlet 194 of the first heat exchanger 114 via pipe 138. The heat of the combusted gas in the first heat exchanger 114 is heating the water to and above its boiling point in order to produce steam. Said steam from the first heat exchanger is transferred from a second outlet 183 to said third inlet 176 of the reformer 104 via said third pipe 130.

In the embodiment of the invention illustrated in FIG. 1a, a first inlet 189 of the second heat exchanger 180 is coupled to a first outlet 185 of the first heat exchanger 114 via a pipe 170. In said pipe 170 combusted gases from the combustor 124, which has passed through the first heat exchanger 114, is provided to the second heat exchanger 180. DME is fed to a second inlet 193 of said second heat exchanger 180 via pipe 190. Said DME is separated from a lubricant within said second heat exchanger 180. Said lubricant may be trapped in said second heat exchanger 180 or fed to the after burner for combustion. DME, which is pure and free from lubricant, is fed to the reformer 104 via a second pipe 126, which is connected between a second outlet 187 of said second heat exchanger 180 and the second inlet 174 of said reformer 104.

Combusted gases are transferred out of said second heat exchanger 180 via a first outlet 191.

In an alternative embodiment the first and second heat exchangers 114, 180 are the same unit.

The temperature in the reformer 104 may be between 350° C.-450° C. The temperature in the CO clean-up device 108 may be between 150° C.-180° C. The temperature in the Fuel cell 122 may be around 80° C. The temperature in the condenser 120 may be 80° C.-50° C. The temperature in the combustor may be between 400° C.-500° C. The temperature of the water before the first heat exchanger 114 may be less than 50° C. The temperature of the steam after the first heat exchanger may be above 140° C. The temperature of the combusted gas before the first heat exchanger may be 400° C.-500° C. The temperature of the combusted gas after the first heat exchanger may be 50° C.-200° C.

Figure 1B:
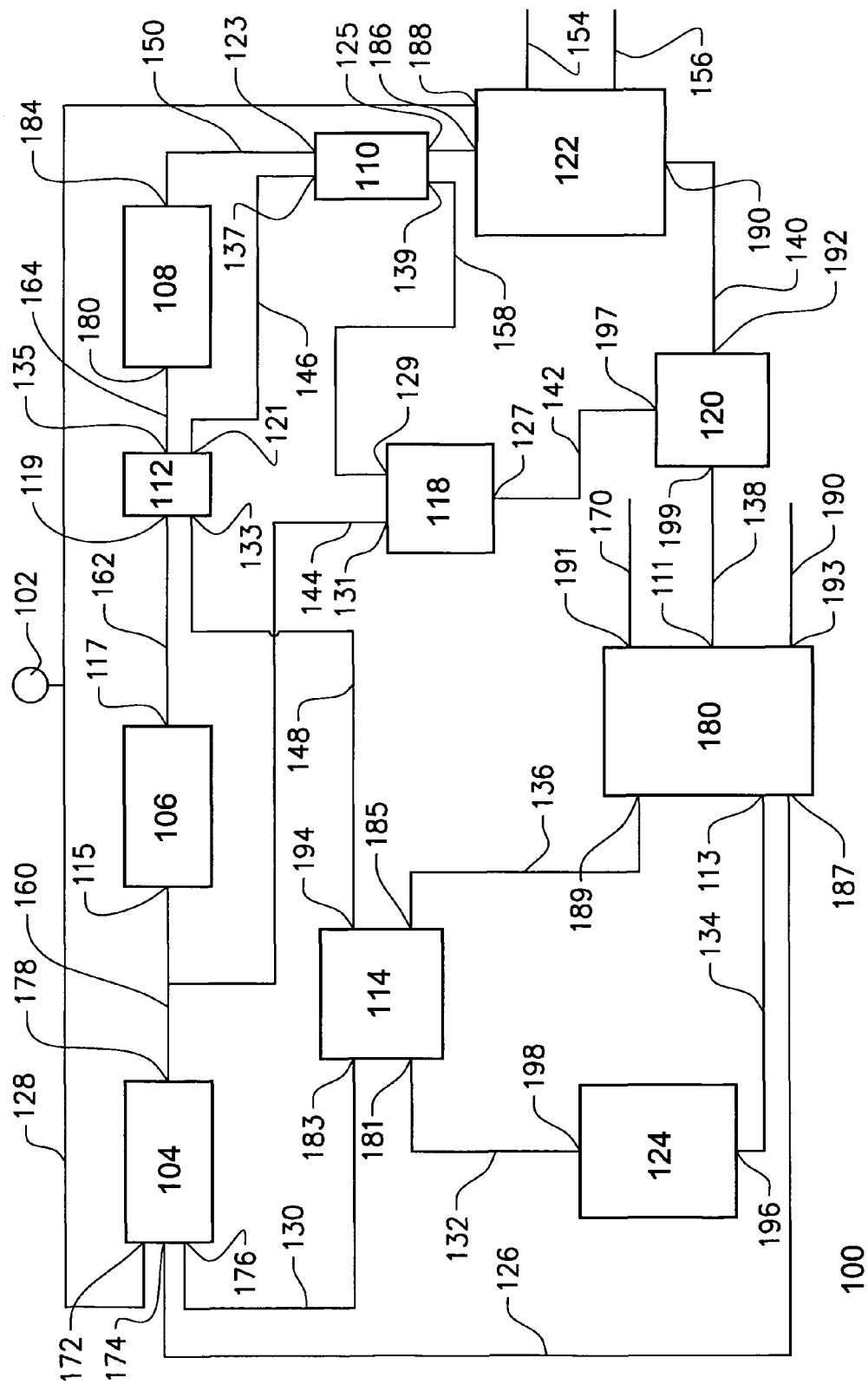
FIG. 1b shows a schematic view illustrating a second example embodiment of an APU according to the invention.

In FIG. 1b an alternative example embodiment of the present invention is illustrated. This embodiment differs compared to the embodiment illustrated in FIG. 1a in that it comprises a water gas shift 106, a third heat exchanger 112, a fourth heat exchanger 110 and a water tank 118. It further differs in that the second heat exchanger 180 is connected in a somewhat different manner. The water gas shift 106 is connected with a first inlet 115 to the outlet 178 of the reformer with the pipe 160. An outlet 117 of said water gas shift 106 is connected to a first inlet 119 of the third heat exchanger 112. A first outlet 135 of said third heat exchanger 112 is connected to the first inlet 180 of the CO clean-up device 108. A first inlet 127 of the water tank is connected to the first outlet 197 of the condenser 120. A first outlet 129 of the water tank is connected to a first inlet 139 of the fourth heat exchanger 110 via pipe 158. A second outlet 131 of said water tank 118 is connected to the first inlet 115 of the water gas shift 106 via pipe 144. A first outlet 137 of said forth heat exchanger 110 is connected to a second inlet 121 of the third heat exchanger 112 via pipe 146. A second outlet 133 of said third heat exchanger 112 is connected to the second inlet 194 of the first heat exchanger 114 via pipe 148. The outlet 194 of CO clean-up device 108 is connected to a second inlet 123 of the forth heat exchanger 110 via pipe 150. The second outlet 125 of said fourth heat exchanger 110 is connected to the first inlet 186 of the fuel cell 122 via pipe 152.

In the embodiment as illustrated in FIG. 1b, the rest gases from the fuel cell 122 is lean of hydrogen due to the set up of cold water injection into the water gas shift 106, the third heat exchanger 112 and fourth heat exchanger 110. The third heat exchanger 112 and the fourth heat exchanger 110 are cooling the gases introduced into the fuel cell 122 and increasing the water/steam content in the same gases.

A lower hydrogen content in the rest gases requires that the temperature of said gases are elevated compared to if the hydrogen content is higher as it is in the embodiment illustrated in FIG. 1a. Increased rest gas temperature is performed by heating said gases in the second heat exchanger 180, i.e., the gases introduced in the after burner 124 are heated by the exhaust gases from the after burner 124 in said second heat exchanger 180.

The temperature in the water gas shift may be around 250° C.-350.

In the embodiment as illustrated in FIG. 1b the steam provided to the reformer 104 is heated in three steps. A first step is in the fourth heat exchanger 110, a second step is in the third heat exchanger 112 and a third step is in the first heat exchanger 114.

In another example the first heat exchanger, which separates the DME fuel from the lubricant, is heated by the gases from the water-condenser. In this example the water condenser is working at some higher temperature and the last water is condensed by rejecting heat to the DME fuel.

It is to be understood that the present invention is not limited to the embodiments described above and illustrated in the drawings; rather, the skilled person will recognize that many changes and modifications may be made within the scope of the appended claims.

The invention claimed is:

1. A vehicle comprising
 an engine for traction power,
 an auxiliary power unit (APU),
 a reservoir of fuel, the fuel being used for running the engine and the APU,
 the APU comprising a fuel processor and a fuel cell, wherein the fuel processor is provided between the fuel reservoir and the fuel cell, wherein the fuel is dimethyl ether (DME), and
 a heat exchange arrangement for separating the DME fuel from at least one lubricant included in the DME, the heat exchange arrangement comprising
  a gas inlet (196) and gas outlet (198) for gases from a water condenser (120) downstream of the fuel cell (122),
  a DME fuel inlet (193) and DME gas outlet (187),
  an outlet (197) for condensed water, and
  an inlet (194) for water from the water condenser (120) and an outlet (183) for steam to the fuel processor, and wherein the heat exchange arrangement is heated by coolant from the fuel cell (122), and the heat exchange arrangement has a coolant inlet and coolant outlet.

2. The vehicle according to claim 1, wherein the heat arrangement is heated by gases from a water condenser.

3. The vehicle according to claim 1, comprising an afterburner in the APU in which the exhaust gases are combusted prior to heating the heat exchange arrangement.

4. The vehicle according to claim 1, wherein the heat exchange arrangement comprises a single unit for providing steam and for separating DME from at least One lubricant is the same unit.

5. The vehicle according to claim 1, wherein the fuel processor is supplied with DME gas free from lubricant and the steam from the heat exchange arrangement.

6. The vehicle according to claim 1, wherein the fuel reformer is connected to the fuel cell via a CO clean-up device.

* * * * *